Figure 1:
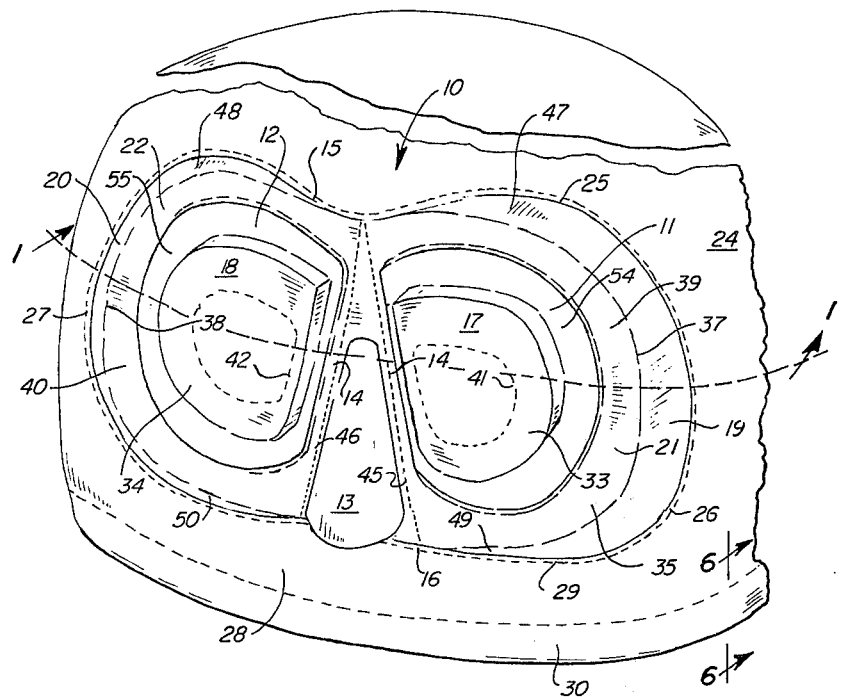

United States Patent [19]
Douglas

[11] 3,895,397
[45] July 22, 1975

[54] FLEXIBLY HINGED EYE PIECE HEADGEAR

[76] Inventor: Donald J. Douglas, 10 Glasgow Rd., White Bear Lake, Minn. 55110

[22] Filed: Jan. 30, 1974

[21] Appl. No.: 438,039

[52] U.S. Cl.......................................... 2/14 W; 2/68
[51] Int. Cl. ................................................ A61f 9/02
[58] Field of Search........ 2/14 W, 14 K, 14 G, 14 Y, 2/14 T, 68

[56] References Cited
UNITED STATES PATENTS

| | | | |
|---|---|---|---|
| 1,727,455 | 9/1929 | Tully | 2/14 G |
| 2,581,007 | 1/1952 | Douglas et al. | 2/14 W X |
| 2,737,659 | 3/1956 | Glidden | 2/14 W |
| 3,591,864 | 7/1971 | Allsop | 2/14 K |
| 3,710,393 | 1/1973 | Douglas | 2/14 W |

Primary Examiner—Werner H. Schroeder
Assistant Examiner—Peter Nerbun
Attorney, Agent, or Firm—Robert C. Baker

[57] ABSTRACT

This headgear comprises a sheath structure having lateral eye accommodating portions connected to a nose accommodating portion of the headgear. Each connection is sufficiently flexible to function as a hinge. Each eye accommodating portion comprising a substantially flat eye-vision area and a temple area elevation curtain outwardly from the substantially flat area. A flange extends outwardly about perimeter portions of the sheath structure. The flange is adapted to be placed substantially into a single plane by tilting the eye accommodating portions, which then causes the flat area of each eye portion to be at an angle to that plane. Also, the flat area of each eye portion is adapted to be tilted to lie in a single plane, which then causes the flange to no longer lie in a single plane.

10 Claims, 6 Drawing Figures

PATENTED JUL 22 1975   3,895,397

FLEXIBLY HINGED EYE PIECE HEADGEAR

This invention relates to novel headgear comprising an eye protecting structure or sheath. More particularly, the invention relates to headgear comprising a sheath structure having lateral substantially flat eye-vision areas capable of being tilted to place both in a single plane (with perimeter flanged portions of the sheath) structure at the temple areas thereof lying at an angle to that plane), or to place both an an angle to a single plane (with perimeter flanged portions of the sheath structure, especially at the temple areas thereof, lying substantially in a single plane).

The features of the new headgear, particularly the sheath structure teachings hereof, permit extraordinarily economical manufacture of rather sophisticated performance headgear. Molds and jigs for sealing various elements such as bonnet structures to the sheath structure need not be specially contoured into a range of elevations when following the teachings hereof.

The prior art on headgear and sheath structures or face masks is extraordinarily extensive; however, none is known which in any way is pertinent to the teachings hereof. Nevertheless, the following prior art is known and is of interest; all patents recited are U.S. Pat. Nos. except as otherwise noted: Iwanami 835,850; Seijo 1,945,919; Wilen 2,317,237; Hawkins 2,408,166; Taylor 2,477,706; Peterson 2,818,859; Schaefer 2,850,011; Katehis 3,345,984. Plus the following U.S. Pat. Nos. and all references cited against each of the same: Neufeld 2,928,097; Johnson et al 3,671,976; Douglas 3,710,393; Johnson et al 3,725,953; and Douglas 3,755,819.

The headgear of this invention is especially useful by swimmers. By following teachings of this invention, headgear particularly helpful for those who must essentially avoid water entrance into the eyes or ears or nose, either for medical reasons or by preference, may be formed. Other uses for headgear of the invention, especially headgear consisting essentially of the sheath or eye covering, are also contemplated. For example, the sheath may be used as an eye protector for engaging in land sports such as skiing of snowmobiling.

The headgear of this invention comprises a sheath structure having lateral eye accommodating portions. Each eye accommodating portion is connected to a nose accommodating portion of the headgear. Each connection between an eye accommodating portion and the nose accommodating portion is sufficiently flexible to function essentially as a hinge for tilting an eye accommodating portion. Each eye accommodating portion comprises a substantially flat eye-vision area adapted to be placed in spaced relationship over an eye of a wearer and a temple area elevation curtain outwardly from the substantially flat area. An outwardly extending flange about perimeter portions of the sheath structure is also present. This flange is adapted to be placed substantially into a single plane by tilting the eye accommodating portions, which then causes the substantially flat area of each eye accommodating portion to be at an angle to the plane. Further, the substantially flat area of each eye accommodating portion is adapted to be tilted into a single plane which then causes the outwardly extending flange to no longer lie in a single plane.

Other features may also be incorporated in the headgear. For example, each eye accommodating portion may include an internal annular channel recess adapted to hold reservoir water for sloshing from one portion of the recess to another across the internal surface of the substantially flat eye-vision area of the eye accommodating portion. The sloshing of reservoir water across the internal surface of the eye-vision area is useful for the purpose of removing fog or mist from the internal surfaces. The fogging or misting of such internal surfaces is widely recognized as a problem by underwater swimmers, particularly where the transparent eye-vision areas of the headgear are formed to have only a single layer of material.

The headgear additionally may include a bonnet member sealed to the substantially flat flange of the sheath structure along at least the lateral and upper perimeter portions of the sheath structure.

Further, the headgear may include substantially flat eye-vision areas which include or comprise two substantially parallel layers of substantially flat transparent material spaced from each other and sealed about the periphery thereof.

Still further, the headgear may include a nostril space at the inside surface of a nose accommodating portion of the headgear for the purpose of permitting nostril breath movement. Also included may be a nostril breath outlet at a peripherally outward portion of the sheath structure for the headgear, especially at a location peripherally outward other than along the lower edge thereof. Further, passage means may be provided for communicating between the nostril space of the nose accommodating portion and the nostril breath outlet. This arrangement permits movement of the nostril breath of the wearer of the headgear from the nose portion thereof to the nostril breath outlet. The outlet for the nostril breath may extend underneath the bonnet for the headgear, or be connected by a tube or passage to an auxiliary tank or bladder or other structure.

Preferably, the headgear teachings hereof, when employed for the manufacture of swimming headgear, will include a head-contacting substantially water-tight seal means at peripheral edge portions thereof.

Additional benefits and advantages provided by teachings of this invention will become evident as this description proceeds.

Figure 6:
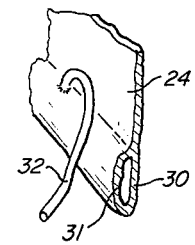
Figure 2:
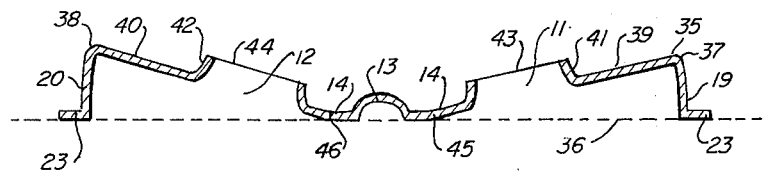
Figure 5:
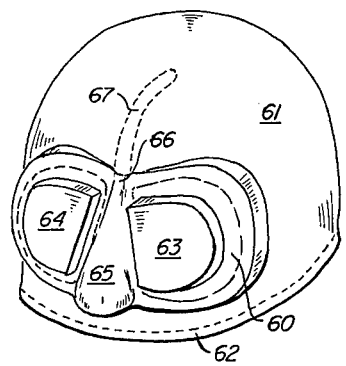
Figure 3:
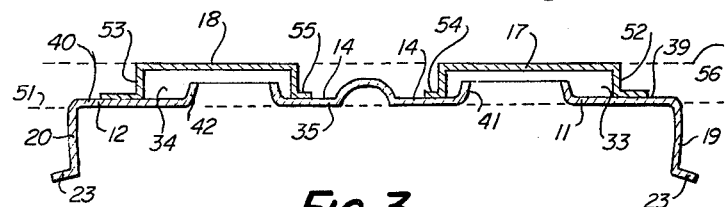
Figure 4:
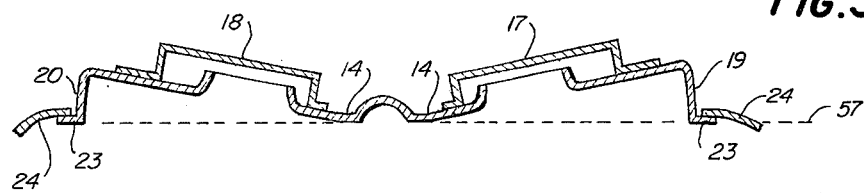

The invention is described with particular reference to a drawing, made a part hereof, wherein:

FIG. 1 is a schematic perspective view, partially broken away, of one type of headgear according to the invention;

FIGS. 2, 3, and 4 are schematic planar cross-sectional view, taken approximately along the curvilinear line 1—1 of FIG. 1, illustrating various steps for the manufacture of one form of headgear according to this invention; in each Figure the dash lines illustrate planes;

FIG. 5 is a schematic perspective view, partially broken away, of an alternate headgear according to the invention, and FIG. 6 is a schematic fragmentary cross-sectional view taken on line 6—6 of FIG. 1, showing one form of head-contacting peripheral seal for the headgear.

Referring particularly to FIG. 1 (and incidentally also to FIGS. 2, 3 and 4), the headgear of this invention comprises a sheath structure 10 having lateral eye accommodating portions 11 and 12. Each eye accommodating portion is connected to a nose accommodating portion 13 of the headgear. Observe that the nose accommodating portion may be part of a composite sheath structure, as illustrated; but it alternatively may be a separate structure separating the sheath into two parts. Further, the nose accommodating portion may be formed as part of a flexible bonnet for the headgear, or it may be formed separately from the flexible bonnet but formed out of a flexible material which is pressed outwardly by the nose of the wearer as the wearer places the headgear on his head, or it may be formed out of rigid molded material or out of a flexible but form retaining material (which might be termed "semi-rigid").

Each connection between an eye accommodating portion 11 and 12 and the nose accommodating portion 13 is a flexible connection, which functions as a hinge. The connections extend along dash lines 14, which can be called a hinge status. The tilting or bending of the eye accommodating portions 11 and 12 at various angles to each other is thus possible. The flexible hinges 14 suitably are created by employing an organic plastic material for them as well as for the material out of which the composite sheath is formed; but alternately a strip of flexible plastic or even elastomeric material may be employed. The connections should extend along the base portion of each side of the nose accommodating portion (between the nose and each eye portion) from the top 15 of the sheath to the bottom 16 thereof. Each flexible connection 14 forms a line of bending or hinging of the eye accommodating part to the nose accommodating part.

Each eye accommodating portion critically comprises a substantially flat eye-vision area 17 and 18 adapted to be placed in spaced relationship over an eye of a wearer. Generally, each of the substantially flat eye-vision areas or layers of the sheath structure will lie in a common plane, or substantially in a common plane, when the headgear of the invention is worn by a user. However, because mass production techniques must be accomplished with some standardization, and because the facial features of individual are not identical in terms of spacing (for example, between a plane extending across the bridge of a person's nose in front of his eyes, and a plane extending parallel thereto through his temple bone areas), it is distinctly possible that not all users of a standardized sheath structure according to the invention will find that the substantially flat eye-vision areas are always in a common single plane as headgear of the invention is worn by them. Some may have facial features which will cause the flat eye-vision areas to be at a slight angle to each other instead of lying in substantially a single plane. Nevertheless, such areas of the headgear according to this invention generally will lie substantially near a single plane, or at a very small angle with respect to a single plane, as the headgear is worn by a majority of users. The benefit thus gained is that the wearer experiences relatively small distortion of vision as compared to that experienced when wearing flat eye-vision areas which are at substantial angles (such as 20° or more) from a single plane.

Each eye accommodating portion 11 and 12 of the sheath structure also includes a temple area elevation curtain 19 and 20 outwardly from the respective substantially flat areas 17 and 18. The temple elevation curtains 19 and 20 are in the nature of a layer or sheet of material which extends outwardly from the temple areas of a wearer and then curve into or are connected (either directly or through an intermediate portion of material) to the laterally outward parts of the substantially flat eye-vision areas 17 and 18 of the sheath. As illustrated in the drawing, the temple curtains 19 and 20 curve sharply into relatively flat planar portions 21 and 22 of a base portion 35 of the composite sheath. It is the temple area elevation curtains 19 and 20 which cause or contribute to causing the substantially flat eye-vision areas 17 and 18 to assume a position reasonably close to a common plane across the face of a wearer when the sheath or headgear of the invention is used.

The sheath includes or has connected to it an outwardly extending flange 23, which is not shown clearly in FIG. 1, but is shown in FIGS. 2, 3 and 4. The flange 23 extends about the perimeter portions of the sheath structure; and the flange 23 is relatively flat in character as it extends outwardly from other structural features of the sheath. It may be curvilinear in contour; but at least it should extend as a substantially flat layer outwardly.

The important feature of the flange is that it is adapted to be placed substantially into a single plane. This may be accomplished suitably by tilting the eye accommodating portions of the sheath at an angle to each other; or the flange 23 may be placed substantially into a single plane and thereby cause the flat areas of the eye accommodating portions to be at an angle to each other. The result is that the flat areas 17 and 18 of each eye accommodating portion lie at an angle to the plane in which the flange 23 lies. The reason for this is because of the temple elevation curtain structures 19 and 20. Further, when the substantially flat areas 17 and 18 of each of the eye accommodating portions are tilted at each flexible connection 14 to the nose accommodating portion 13 into a single plane (so that the flat areas of each eye accommodating portion lie in essentially a single plane), the net result is to cause the substantially flat flange 23 of the sheath to no longer lie in a single plane. Flange 23 is suitably sealed to bonnet 24, at or along the upper 25 and lateral edges 26 and 27 of the sheath. A strip of bonnet or other material 28 may extend and be sealed to the lower edge 29.

Additionally, headgear for swimming use may be provided with any suitable means 30 to form a head-contacting substantially water-tight seal about peripheral edge portions of it. If headgear for swimming use consists simply of a sheath 10, then a substantially water-tight sealing means should be about the peripheral edges (25, 26, 27 and 29) of the sheath per se. Suitably, the peripheral edges of a sheath may extend across the upper lip, below cheek bones, across temple areas and across the forehead (generally near the eyebrows). A seal for excluding water from entrance into the interior of bonnet type headgear suitably extends approximately along a line characterized as across the upper lip of a wearer, below the ears, and about the nape of the neck.

A suitable seal means may be formed by affixing a flexible tubular structure at the peripheral portion of the headgear. As illustrated in FIGS. 1 and 6, a flexible tube 31 may be formed or fixed by sealing at the inside surface of the headgear along its peripheral edge. A resilient compressible material (for example, a porous resilient or elastomeric material such as natural or synthetic rubbery material) may be incorporated as a strip or band filler within the tubular element 31. If desired, a belt or strip, elastomeric or otherwise, may be employed about the exterior of the peripheral edge of the headgear (with or without a tubular element) to assist in pressing the edge against the surface of the skin of a wearer. Further, air inflation of a tubular element (with or without an internal resilient filler or the like) may be employed. A simple means for pneumatic inflation of a tubular element 31 consists of a tube 32 communicating with the interior of the tubular element 31. The tube 32 may be long enough for the wearer to orally inflate the tubular element 31 and then be folded and pressed between the tubular element 31 and the skin of the wearer. Thus, the tube 32, by folding and fixing it in place, serves the function of a valve.

The particular sheath structure illustrated in FIG. 1 employs eye accommodating portions having internal annular channel recesses 33 and 34 adapted to hold reservoir water for sloshing from one portion of the recess to another portion thereof across the internal surface of the substantially flat eye-vision area 17 and 18.

In order to illustrate further technical details of the device illustrated in FIG. 1, a suitable process of manufacture will be described with particular reference to the schematic planar cross-sections of FIGS. 2, 3 and 4.

An illustrative base part 35 for a sheath structure according to the invention is illustrated in FIG. 2. The peripheral flange portion 23 thereof is shown to lie in a single plane illustrated by dash line 36. Observe that each temple curtain 19 and 20 extends upwardly or outwardly from the base flange 23 and then curves at a corner or ridge 37 and 38 into a relatively flat area 39 and 40 which extends to an outwardly projecting rim 41 and 42. Each outwardly projecting rim 41 and 42 surrounds an opening 43 and 44 and forms a visual border thereabout. A narrow band 45 and 46 of material extends from the part of each rim 41 and 42 nearest the nose accommodating portion toward that nose accommodating portion 13. These narrow bands 45 and 46 of material usually are relied upon to perform the flexible connector function as described hereinabove for the hinges 14. At least some part of the narrow bands or strips 45 and 46 should be sufficiently flexible to function as a hinge and permit bending or tilting of each eye accommodating part 11 and 12 with respect to the other. Indeed, in unitary sheaths where the nose accommodating portion 13 is unitary with and consists of a projection out of the material forming the base 35 of the sheath 10, the portion of that base part 35 adjacent the base of the nose must exhibit the noted flexibility. Further, it is entirely suitable to employ flexible but memory recoverable or form retaining material for the entire base part 35 of the sheath. Thus semi-rigid materials (which can be bent but return to shape) are suitable to employ. But at the very least the flexible connector parts or hinges 14 must exhibit the noted flexibility, whether other parts of the sheath do or not.

It is further to be emphasized that the lines of flexible connectors 14, from the top 15 to the bottom 16 of the structure, should lie in approximately a straight line, preferably in approximately the same plane as the portion of flange 23 extending outwardly from the sheath (at the top and bottom thereof) at the intersection of the flexible connectors 14 with flange 23.

The base portion 35 of the sheath as illustrated in FIG. 2 may be molded in any suitable manner. Flat organic plastic sheets may be formed into the base shape 35. That base part may even be formed out of stiff or rigid sheet material, provided the connection 45 and 46 forming hinges 14 between each eye accommodating portion and the nose accommodating portion of the headgear are separately or specially formed. Preferably, the base part 35 is formed using flexible but form retaining sheet material, which for lack of a better term is suitably called semi-rigid herein. Illustratively, transparent polyvinyl chloride films or sheet materials are excellent to employ in forming the entire base part 35.

To be observed is that the elevations 19 and 20 for temple areas suitably extend toward the flexible hinge connections 14 (at the intersection of the same at the top 15 and bottom 16 of the sheath). Note the "pie-shaped" upper elevation parts 47 and 48 and lower elevation parts 49 and 50 in FIG. 1. Thus, the elevations 19 and 20, at the temple areas, gradually diminish (see parts 47, 48 and 49, 50) as they extend about the plateau or flat areas 39 and 40 of the base part 35 toward the flexible hinges 14. Of course, if desired, the flat portions of the eye accommodating parts may be elevated or projected outwardly more greatly than illustrated, with an elevation curtain extending completely around the same.

After forming a base part 35, the areas broadly characterized as eye accommodating 11 and 12 are shifted so that the plane or flat portions 39 and 40 of them are placed in a single plane 51, as shown in FIG. 3. This in turn causes the flange part 23 at the peripheral edge to mostly lie at an angle to the plane 51. At least the flat flange portions 23 which are adapted to come into contact or substantially into contact with temple areas of a user are placed at an angle to the plane 51. Then the flat eye-vision area pieces 17 and 18 are added to the structure. Observe that the flat eye-vision area pieces 17 and 18 each essentially comprise a flat front layer 17 and 18 which merges into a rim 52 and 53 extending away from the flat front layer 17 and 18 in one direction. Then outwardly from each rim 52 and 53 extends a flange 54 and 55. Rims 52 and 53 are spaced from the outwardly projecting rims 41 and 42 of the base part 35 of the sheath (to provide reservoir space for sloshing water). Each flat eye-vision layer 17 and 18 is likewise spaced outwardly from the respective outermost edge of the rim 41 and 42 with which it is associated (to allow sloshing water to be moved out of the reservoir to clear fog). The flanges 54 and 55 are sealed suitably by dielectric sealing to the base part 35 of the structure. Of especial significance is the fact that the seal lines for accomplishing this lie in a single plane, which contributes greatly to economy. Further, the flat surfaces of layers 17 and 18 lie in a single plane 56.

Rims 41 and 52, as well as rims 42 and 53, form an annular channel recess adapted to receive reservoir water for sloshing over the interior surface of flat parts 17 and 18 to clear fog or mist from them.

Thereafter, the sheath is shifted to the position schematically illustrated in FIG. 4, with essentially all parts of the outer flange 23 of the sheath lying in a single plane 57. In this condition, the bonnet 24 is sealed to the sheath. Dielectric heat sealing is generally suitable to employ to join the flange 23 and the film or layer of the bonnet 24.

The advantage of flat sealing (whether dielectric or otherwise) at various stages of manufacture is tremendous. Curviplanar variation for a curvilinear line of seal requires expensive equipment, whereas curvilinear lines of seal in a single plane, as taught herein, permit relatively sophisticated sheath type headgear to be manufactured at a price within an economically feasible range for reasonable expectation of commercial success. But equally significant is the fact that sheath type headgear as heretofore known has never permitted the approach for manufacture and the end result performance features in use as taught herein. It is the combination of rather significant performance features and practical manufacture which makes this invention unusual.

Even when relatively flexible films are employed to form the sheath, the nature of the contours and ridges and corners molded into the sheet to form the sheath is such as to impart a semi-rigid (that is, a flexible but form-retaining) character to the end product.

A wide variety of sheath type structures may be formed using the principles aforediscussed. In FIG. 5, the sheath structure 60, bonnet 61 and peripheral water-excluding seal structure 62 are all similar to comparable elements illustrated in FIG. 1, with the exception of the following details for the sheath structure. First, the water sloshing annular reservoir is lacking in the sheath 60. Instead, a dual lense structure 63 and 64 is employed for each eye-vision area. Formation of a "dual lense" structure is easily accomplished by employing a base part for the sheath comparable to base part 35 of FIG. 2, except that the rims 41 and 42 and openings 43 and 44 are omitted. In other words, a continuous sheet or layer of material is employed over the entire eye-vision area. Then a further layer of material (comparable to the eye pieces having elevated planes 17 and 18 as shown in FIG. 3) is sealed over the eye-vision areas, with an intervening dead air space. The advantage of such "dual lens" structures is mainly that they are highly resistant to misting or fogging on the innermost internal surface next to the face of the user.

A second distinguishing feature of the structure in FIG. 5 is that with respect to the nose accommodating portion 65. Within the nose portion 65 is a nostril space sufficiently large to permit air from the nostrils to move. At the upper edge of the sheath is a nostril breath outlet 66 located underneath at least one layer of bonnet material 61. Between the nostril space at the bottom of the nose portion 65 and the outlet 66 is a passage molded into or added to the sheath structure. The passage may be a conduit in nature (or simply a channel formed by buldging out the nose portion and extending the buldge over the nose bridge area between the eyebrows, and forming the lateral edges so that they come in substantial contact with facial features of a user, substantially as illustrated). The important point is that the passage communicates with the nostril space of the nose accommodating portion 65 and the outlet 66 and serves to carry nostril breath from the nose portion to the outlet. If desired, an extension conduit 67 may be connected to the outlet 66 at the upper edge of the sheath to shift the outlet port of the passage to any desired location underneath a bonnet or to some other location.

Still other modifications and variations may be incorporated in the headgear or the sheath structures taught herein; and disclosure from my U.S. Pat. Nos. 3,710,393 and 3,755,819 is here incorporated by reference. In particular, the bonnet for the headgear may be formed out of rigid materials and be large enough to preserve the grooming of one's hair. It may be transparent. It may alternatively be flexible and inflatable after being placed on the head of a user. Organic plastics, including rubbery materials, may be employed as the material out of which to form the bonnet. Polyvinyl chloride plastisol compositions are especially useful; but a wide variety of materials may be employed, as will be understood.

At least the eye-vision areas of the eye accommodating portions of sheaths according to the invention should obviously be transparent. Frequently, for appearance and attractiveness, the entire eye accommodating portions and even the nose accommodating portion should be transparent; but opaque areas of various colors and of various designs may be incorporated in the sheath in parts where transparency for viewing is unimportant.

Interestingly, the character of the sheath teaching herein is such that it may be looked upon as having two separated eye accommodating parts, each of which has a mass which lies substantially within a wedge shape defined by two planes which intersect somewhere near a medial or nose location between the eye accommodating parts.

That which is claimed is:

1. Headgear comprising a sheath structure having lateral eye accommodating portions, each said eye accommodating portion being connected to a nose accommodating portion of said headgear, each said connection between a said eye accommodating portion and said nose accommodating portion being sufficiently flexible to function as a hinge for tilting a said eye accommodating portion, each said eye accommodating portion comprising a substantially flat eye vision area adapted to be placed in spaced relationship over an eye of a wearer and a temple area elevation curtain outwardly from said substantially flat area, an outwardly extending substantially flat flange about perimeter portions of said sheath structure, said flange being substantially non-parallel to said substantially flat eye vision areas at the lateral extremities of said flange adjacent said temple area elevation curtains said flange being adapted to be placed substantially into a single plane by tilting said eye accommodating portions, which then causes said substantially flat area of each said eye accommodating portion to be at an angle to said plane, and said substantially flat area of each said eye accommodating portion being adapted to be tilted into a single plane which then causes said outwardly extending flange to no longer lie in a single plane.

2. The headgear of claim 1 wherein each said eye accommodating portion of said sheath structure includes an internal annular channel recess adapted to hold reservoir water for sloshing from one portion of said recess to another across the internal surface of the substantially flat eye vision area thereof.

3. The headgear of claim 1 additionally comprising a bonnet member sealed to said substantially flat flange along at least the lateral and upper perimeter portions of said sheath structure.

4. The headgear of claim 1 wherein each said substantially flat eye vision area comprises two substantially parallel layers of substantially flat transparent material spaced from each other and sealed about the periphery thereof.

5. The headgear of claim 1 wherein said nose accommodating portion includes a nostril space for nostril breath movement, and said headgear additionally comprises a nostril breath outlet at a peripherally outward portion of said sheath structure, and passage means communicating between said nostril space and said outlet.

6. The headgear of claim 1 additionally comprising head-contacting substantially water-tight sealing means at peripheral edge portions of said headgear.

7. Headgear comprising a nose accommodating portion, semi-rigid lateral eye accommodating portions, a connecting means between each said eye accommodating portion and said nose accommodating portion, each said connecting means being lateral to said nose accommodating portion and being sufficiently flexible to function as a hinge for tilting a said eye accommodating portion, each said eye accommodating portion comprising a substantially flat eye vision area adapted to be placed in spaced relationship over an eye of a wearer and a temple area elevation curtain outwardly from said substantially flat area, an outwardly extending substantially flat flange about at least the perimeter portions of said temple area elevation curtains outwardly from said nose accommodating portion, said flange at said perimeter portions being substantially non-parallel to said substantially flat eye vision areas, said flange being adapted to be placed substantially into a single plane by tilting said eye accommodating portions, which then causes said substantially flat area of each said eye accommodating portion to be at an angle to said plane, and said substantially flat area of each said eye accommodating portion being adapted to be tilted into a single plane which then causes said flange to no longer lie in a single plane.

8. The headgear of claim 7 wherein said eye accommodating portions are united as part of a composite sheath structure of organic plastic material.

9. The headgear of claim 8 wherein said nose accommodating portion comprises part of said composite sheath structure.

10. The headgear of claim 7 wherein said nose accommodating portion is formed out of material different from the material of said eye accommodating portions.

* * * * *

UNITED STATES PATENT OFFICE
CERTIFICATE OF CORRECTION

Patent No. 3,895,397   Dated July 22, 1975

Inventor(s) Donald J. Douglas

It is certified that error appears in the above-identified patent and that said Letters Patent are hereby corrected as shown below:

Column 1, line 9, delete parenthesis after "sheath".

Column 3, line 18, "status" should read --situs--.

Column 3, line 41, "individual" should read --individuals--.

Column 8, line 41 (Claim 1), should read a comma after "curtains".

Signed and Sealed this twenty-eight Day of October 1975

[SEAL]

Attest:

RUTH C. MASON
Attesting Officer

C. MARSHALL DANN
Commissioner of Patents and Trademarks